Crever & Keeney,
Cider Mill.

Nº 49,088.  Patented Aug. 1, 1865.

Witnesses:
J. H. Layman
Andrw O'Neill

Inventors:
J. A. Crever
& H. Keeney
By Knight Bros.
attys

UNITED STATES PATENT OFFICE.

JAMES A. CREVER AND FIELDING H. KEENEY, OF CINCINNATI, OHIO.

IMPROVEMENT IN CIDER-MILLS.

Specification forming part of Letters Patent No. 49,088, dated August 1, 1865.

*To all whom it may concern:*

Be it known that we, JAMES A. CREVER and FIELDING H. KEENEY, of Cincinnati, Hamilton county, Ohio, have invented a new and useful Improvement in Mills for Crushing and Expressing the Juice from Fruits, Vegetables, &c.; and we do hereby declare the following to be a full, clear, and exact description thereof, reference being had to the accompanying drawings, making part of this specification.

Our invention relates to an arrangement of a concave or hollow cylinder in connection with a convex cylinder or roller of somewhat smaller diameter and interiorly tangential to said concave, with which it meshes and revolves in unison, and the crushing and expressing actions are performed by and between the mutually-progressing and gradually-converging surfaces of said roller and concave.

Figure 1:
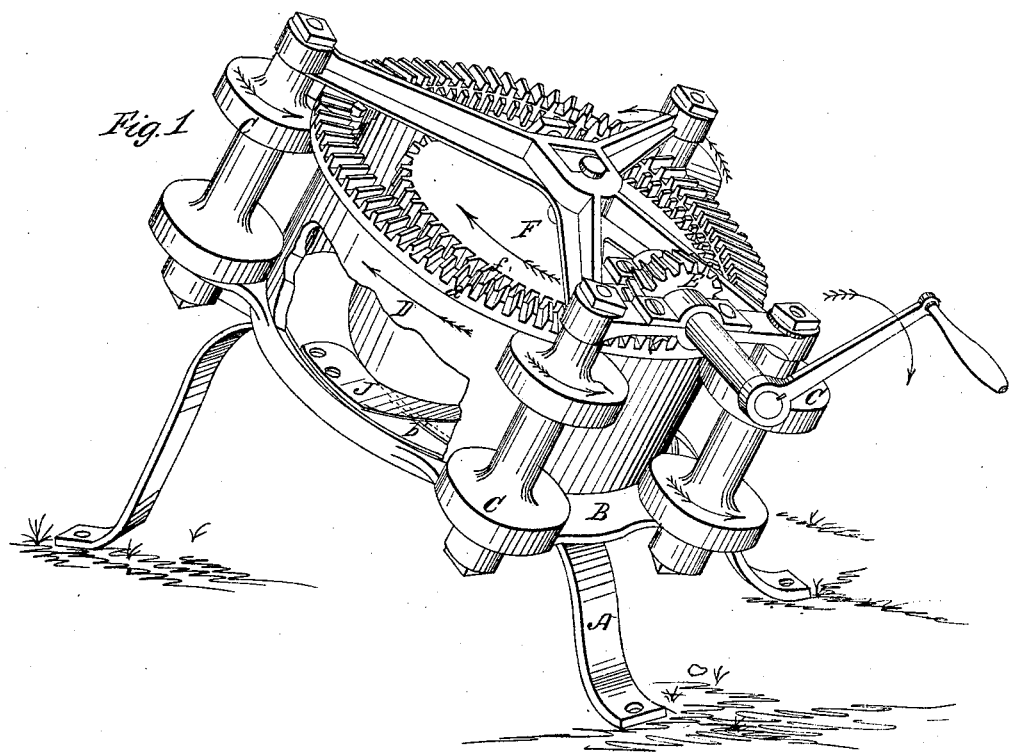
Figure 2:
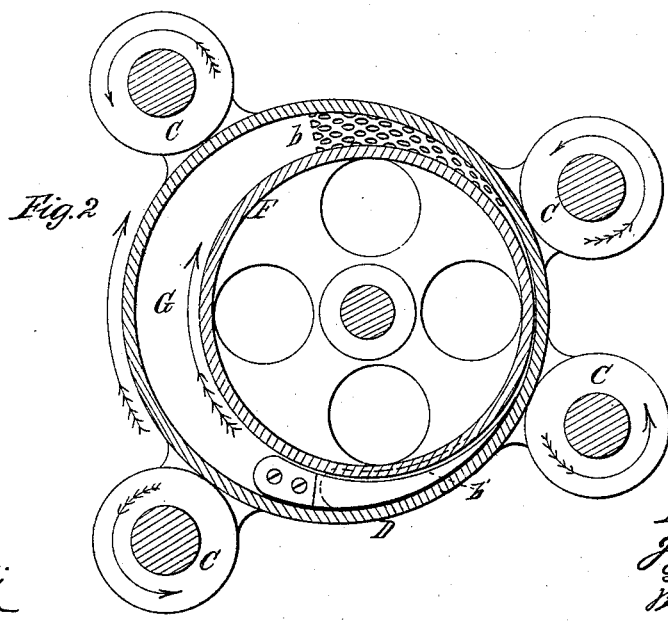

Figure 1 is a perspective view of a mill embodying our improvements. Fig. 2 is a latitudinal section of the same.

A is a frame or stand, supporting at a suitable slope and elevation a circular floor, B, having near its lower part numerous apertures, $b$, for the escape of the expressed juice, and having near its upper part an aperture, $b'$, for the escape of pomace.

Journaled in the stand vertically to the slope of the floor B are friction-wheels C, which confine, while permitting the rotation of, a cylinder, D, whose upper end has a bevel-wheel, $d$, which meshes with a corresponding pinion, E, by which it is rotated.

Journaled in the frame A, so as to be interiorly tangential to the concave or inner surface of the cylinder D, is a convex cylinder or roller, F, of somewhat less diameter than the concave D, with which it meshes and revolves by means of cogs $d''$ and $f$.

I is a plate attached to the floor B and rising obliquely upward, its edges scraping the sides of both concave and roller.

When designed for expressing the juice of grapes the roller D may have its periphery clothed with india-rubber or its equivalent, so as to avoid crushing the seeds and stems.

Operation: The cylinder being set in motion, apples, beets, or other fruits or vegetables are fed into the crescent-formed space G, and being grasped by the simultaneously progressing and converging surfaces of the roller and the concave, are at the same time fed forward and crushed, so as to express their juices, which, descending, pass off through the apertures $b$ into a trough or other suitable receptacle, while the pomace, passing through between the roller and the concave, becomes detached by the scraper I and drops out at the aperture $b'$.

We claim herein as new and of our invention—

The employment, in a crushing and expressing mill, of a cylindrical concave, D, revolving in partial contact with a smaller and interior cylinder or roller, F, in the manner and for the objects substantially as set forth.

In testimony of which invention we hereunto set our hands.

JAMES A. CREVER.
  FIELDING H. KEENEY.

Witnesses:
 GEO. H. KNIGHT,
 JAMES H. LAYMAN.